United States Patent
Sand

[11] Patent Number: 5,833,218
[45] Date of Patent: *Nov. 10, 1998

[54] DEGRESSIVE GAS SPRING

[75] Inventor: Gunnar Sand, Huskvarna, Sweden

[73] Assignee: Stromsholmen AB, Tranas, Sweden

[*] Notice: This patent issued on a continued prosecution application filed under 37 CFR 1.53(d), and is subject to the twenty year patent term provisions of 35 U.S.C. 154(a)(2).

[21] Appl. No.: 564,340

[22] PCT Filed: May 27, 1994

[86] PCT No.: PCT/SE94/00500

§ 371 Date: Dec. 12, 1995

§ 102(e) Date: Dec. 12, 1995

[87] PCT Pub. No.: WO95/00772

PCT Pub. Date: Jan. 5, 1995

[30] Foreign Application Priority Data

Jun. 17, 1993 [SE] Sweden .................................. 9302097

[51] Int. Cl.⁶ .................................................... F16F 9/02
[52] U.S. Cl. ........................................ 267/64.25; 267/113
[58] Field of Search ............................. 267/64.11, 64.25, 267/64.28, 224, 225, 113

[56] References Cited

U.S. PATENT DOCUMENTS

| | | | |
|---|---|---|---|
| 1,214,343 | 1/1917 | Matthews | 267/64.25 |
| 2,977,146 | 3/1961 | Edwards et al. | 267/64.25 |
| 3,328,019 | 6/1967 | Wilson | 267/64.25 |
| 3,646,807 | 3/1972 | Gray et al. | 73/71.6 |
| 4,270,771 | 6/1981 | Fujii | 267/64.25 |
| 5,100,113 | 3/1992 | Imanishi | 267/119 |

FOREIGN PATENT DOCUMENTS 95000772 1/1995 WIPO .................................. 267/64.25

*Primary Examiner*—Matthew C. Graham
*Attorney, Agent, or Firm*—Merchant, Gould, Smith, Edell, Welter, & Schmidt, P.A.

[57] ABSTRACT

The invention relates to a degressive gas spring. This has two cylinder-piston units (1, 2), one of which is selected as a working spring (1) and the other as a slave spring (2), the cylinders (1a; 2b) and the ends of the piston rods (1b; 2b) of which are mutually operatively connected so that compression of the working spring (1) also brings about simultaneous compression of the slave spring (2). The piston rod (1b; 2b) of each spring unit (1; 2) is mounted in an end wall (1c; 2c) in such a way as to be capable of sliding and supports a piston (1h; 2h). The axial position of this in the cylinder (1a; 2a) determines the volume of an enclosed, gas-filled space (1i; 2i) inside the unit. The piston (1h; 2h) in each spring unit (1; 2) is sealed against the cylinder wall (1a; 2a). The piston (1h; 2h) and/or the end wall (1c; 2c) has a recess which forms an annual chamber (1j; 2j). The piston rod (2b) in the slave spring unit (2) has a smaller diameter than that in the working spring unit (1). The annular chamber (2j) of the slave spring unit (2) communicates with the enclosed space (1i) of the working spring unit (1), and the annular chamber (1j) of the working spring unit (1) communicates with the enclosed space (2i) in the slave spring unit (2). The connections (1l; 2l), which discharge into said enclosed spaces (1i; 2i), are position in such a way that communication remains unobstructed by the movement of the piston in the respective unit (1, 2).

9 Claims, 1 Drawing Sheet

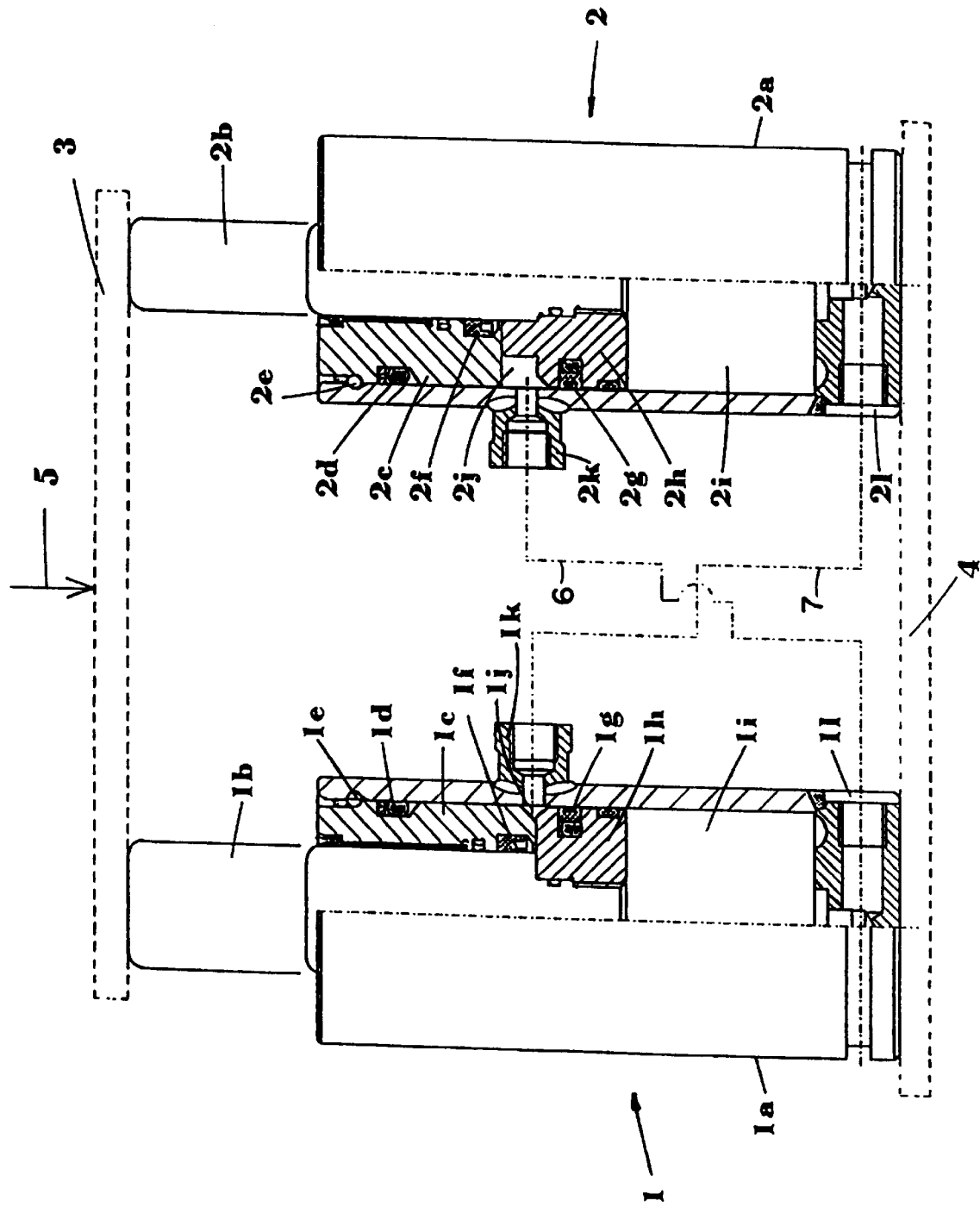

DEGRESSIVE GAS SPRING

BACKGROUND OF THE INVENTION

The present invention relates to a degressive gas spring comprising two cylinder-piston units, one of which is selected as a working spring and the other as a slave spring, the cylinders and the ends of the piston rods of which are mutually operatively connected so that compression of the working spring brings about simultaneous compression of the slave spring, in conjunction with which the piston rod of each spring unit is mounted in an end wall in such a way as to be capable of sliding and supports a piston, the axial position of which in the cylinder determines the volume of an enclosed, gas-filled space inside the unit.

A gas spring of the aforementioned kind comprises two cylinder-piston units, one of which is equipped with a so-called plunge type piston. The cylinders and the ends of the piston rods are mutually operatively in order for the cylinder-piston units to be compressed simultaneously. When the plunge type piston is compressed, gas is forced to the piston rod side chamber of the other cylinder and the gas in the chamber below the piston of this cylinder-piston units flows unrestricted into a separate chamber whereby a degressive characteristic for the gas spring is achieved. The gas spring described here, however, has cylinder-piston units of entirely different construction, which is disadvantageous, amongst other things, from the point of view of spare parts stock and production.

SUMMARY OF THE INVENTION

The object of the present invention is to make available a degressive gas spring in which the aforementioned disadvantages have been eliminated as far as possible. This has been achieved in accordance with the invention in that the piston in each spring unit is sealed against the cylinder wall, in that the piston and/or the end wall has a recess which forms an annular chamber, in that the piston rod in the slave spring unit has a smaller diameter than that in the working spring unit, in that the annular chamber of the slave spring unit communicates with the enclosed space of the working spring unit, and in that the annular chamber of the working spring unit communicates with the enclosed space in the slave spring unit, in conjunction with which connections discharging into said enclosed spaces are positioned in such a way that communication remains unobstructed by the movement of the piston in the respective unit.

The construction of the gas spring in accordance with the invention makes it possible, in relation to earlier degressive gas springs, to achieve a considerable reduction in its dimensions whilst retaining otherwise unchanged characteristics.

BRIEF DESCRIPTION OF THE DRAWING

The invention is described in greater detail below with reference to the accompanying drawing, in which an embodiment of the degressive gas spring in accordance with the invention is illustrated schematically and as a partially sectioned view.

DETAILED DESCRIPTION OF THE PREFERRED EMBODIMENT

The designations 1 and 2 are used generally in the drawing in respect of two cylinder-piston units, of which the unit 1 is regarded as a working spring unit and the unit 2 as a slave spring unit. The cylinders 1*a*, 2*a* of the units and the ends of the piston rods are mutually operatively connected—by means of a yoke 3, 4 in the embodiment shown in the drawing—so that, when a force marked with an arrow 5 acts on the yoke 3, both cylinder-piston units are compressed. In a practical application, the units may be affected by, for example, two different parts of a single mechanical component, or by two mechanical components capable of synchronous movement. The piston rod 1*b*, 2*b* of each unit is mounted in corresponding end walls 1*c*, 2*c* in such a way as to be capable of sliding. The end walls 1*c*, 2*c* are sealed against the respective cylinder 1*a*, 1*b* by means of an 'O'-ring 1*d* and 2*d*, and are conventionally fixed with a locking ring 1*e* and 2*e*. There are also seals 1*f*, 2*f*; 1*g*, 2*g* between the end wall 1*c*, 2*c* and the associated piston rod 1*b* and 2*b*, and between the wall of the cylinder 1*a*, 2*a* and the associated piston 1*h* and 2h. In each unit, the axial position of the piston 1*h* and 2*h* in the cylinder 1*a* and 2*a* determines the volume of a gas-filled space 1*i* and 2*i*.

Apart from the piston 1*h* and 2*h* being sealed against the wall of the cylinder 1*a* and 2*a*, the piston 1*h* and 2*h* and/or the end wall 1*c* and 2*c* has a recess which forms an annular chamber 1*j* and 2*j* in accordance with the invention. In the embodiment shown in the drawing, the annular chamber 1*j* is formed from recesses in the form of chamfers in the end wall 1*c* and in the piston 1*h*, whereas the annular chamber 2*j* is formed by only a single recess in the piston 2*h*. The volume of the annular chamber 2*j* is also greater than that of the annular chamber 1*j*, in order to ensure that the units are of identical overall length. The piston rod 2*b* has a smaller diameter than the piston rod 1*b*.

Each of the cylinder-piston units 1, 2 has two connections 1*k*, 1*l* and 2*k*, 2*l*. The connections 1*k*, 2*k* discharge into the annular chambers 1*j* and 2*j*, whereas the connections 1*l*, 2*l* discharge into the gas-filled spaces 1*i* and 2*i*, and are positioned in such a way that the movement of the piston 1*h* and 2*h* does not obstruct the flow orifices of the connections 1*l*, 2*l*. The cylinder-piston units are mutually connected via the aforementioned connections 1*k*, 1*l* and 2*k*, 2*l* by means of pipe or hose lines 6, 7, in such a way that the annular chamber 2*j* communicates with the space 1*i* via the line 6, and the space 2*i* is connected to the annular chamber 1*j* via the line 7.

When the degressive gas spring in accordance with the invention is affected by a force, marked by the arrow 5, the gas present in the spaces 1*i*, 2*i* will be transported to the annular chambers 2*j* and 1*j* via the lines 6, 7. The gas inside the annular chambers 1*j*, 2*j* endeavours to force the respective piston 1*h*, 2*h* downwards, with the consequence that an increasingly small force is required to compress the gas spring, i.e. it exhibits a degressive spring characteristic. Through the appropriate choice of ratio between, on the one hand, the piston rod diameter of the unit and, on the other hand, the piston diameter, it is possible to vary the spring characteristic so that the required compression force approaches zero.

I claim:

1. Degressive gas spring, comprising:

two cylinder-piston units, one of which is selected as a working spring unit and the other as a slave spring unit;

two cylinders each having a cylinder wall;

two piston rods each having an end, the cylinders and the ends of the piston rods being mutually operatively connected so that compression of the working spring unit also brings about simultaneous compression of the slave spring unit, in conjunction with which each of the piston rods of each spring unit is mounted in an end wall in such a way as to be capable of sliding and supporting a piston, an axial position of which in each of the cylinders determines a volume of an enclosed, gas-filled space inside the spring unit;

wherein the piston in each spring unit is sealed against the cylinder wall;

wherein the space between the respective pistons and the respective end walls, when the respective pistons are at a an axial position away from the respective end walls, forms annular chambers;

wherein the annular chamber of the slave spring unit communicates with an enclosed space of the working spring unit; and wherein the annular chamber of the working spring unit communicates with an enclosed space in the slave spring unit.

2. Degressive gas spring, comprising:

two cylinder-piston units, one of which is selected as a working spring unit and the other as a slave spring unit;

two cylinders each having a cylinder wall;

two piston rods each having an end, the cylinders and the ends of the piston rods being mutually operatively connected so that compression of the working spring unit also brings about simultaneous compression of the slave spring unit, in conjunction with which each of the piston rods of each spring unit is mounted in an end wall in such a way as to be capable of sliding and supporting a piston, an axial position of which in each of the cylinders determines a volume of an enclosed, gas-filled space inside the spring unit;

wherein the piston in each spring unit is sealed against the cylinder wall;

wherein the end wall has a recess, which forms an annular chamber;

wherein the piston rod in the slave spring unit has a smaller diameter than that in the working spring unit both units having identical overall lengths;

wherein the annular chamber of the slave spring unit communicates with an enclosed space of the working spring unit; and wherein the annular chamber of the working spring unit communicates with an enclosed space in the slave spring unit, in conjunction with which connections discharging into said enclosed spaces are positioned in such a way that communication remains undisturbed by a movement of the piston in the respective spring unit.

3. Degressive gas spring, comprising:

two cylinder-piston units, one of which is selected as a working spring unit and the other as a slave spring unit;

two cylinders each having a cylinder wall;

two piston rods each having an end, the cylinders and the ends of the piston rods being mutually operatively connected so that compression of the working spring unit also brings about simultaneous compression of the slave spring unit, in conjunction with which each of the piston rods of each spring unit is mounted in an end wall in such a way as to be capable of sliding and supporting a piston, an axial position of which in each of the cylinders determines a volume of an enclosed, gas-filled space inside the spring unit;

wherein the piston in each spring unit is sealed against the cylinder wall;

wherein the piston and the end wall have a recess, which forms an annular chamber;

wherein the piston rod in the slave spring unit has a smaller diameter than that in the working spring unit;

wherein the annular chamber of the slave spring unit communicates with an enclosed space of the working spring unit; and wherein the annular chamber of the working spring unit communicates with an enclosed space in the slave spring unit, in conjunction with which connections discharging into said enclosed spaces are positioned in such a way that communication remains undisturbed by a movement of the piston in the respective spring unit.

4. Degressive gas spring in accordance with claim 3, wherein the volume of the annular chamber in the slave spring unit is greater than that of the annular chamber in the working spring unit.

5. Degressive gas spring, comprising:

two cylinder-piston units, one of which is selected as a working spring unit and the other as a slave spring unit;

two cylinders each having a cylinder wall;

two piston rods each having an end, the cylinders and the ends of the piston rods being mutually operatively connected so that compression of the working spring unit also brings about simultaneous compression of the slave spring unit, in conjunction with which each of the piston rods of each spring unit is mounted in an end wall in such a way as to be capable of sliding and supporting a piston, an axial position of which in each of the cylinders determines a volume of an enclosed, gas-filled space inside the spring unit;

wherein the piston in each spring unit is sealed against the cylinder wall;

wherein the piston and the end wall have a recess, which forms an annular chamber;

wherein the piston rod in the slave spring unit has a smaller diameter than that in the working spring unit both units having identical overall lengths;

wherein the annular chamber of the slave spring unit communicates with an enclosed space of the working spring unit; and wherein the annular chamber of the working spring unit communicates with an enclosed space in the slave spring unit, in conjunction with which connections discharging into said enclosed spaces are positioned in such a way that communication remains undisturbed by a movement of the piston in the respective spring unit.

6. Degressive gas spring, comprising:

two cylinder-piston units, one of which is selected as a working spring unit and the other as a slave spring unit;

two cylinders each having a cylinder wall;

two piston rods each having an end, the cylinders and the ends of the piston rods being mutually operatively connected so that compression of the working spring unit also brings about simultaneous compression of the slave spring unit, in conjunction with which each of the piston rods of each spring unit is mounted in an end wall in such a way as to be capable of sliding and supporting a piston, an axial position of which in each of the cylinders determines a volume of an enclosed, gas-filled space inside the spring unit;

wherein the piston in each spring unit is sealed against the cylinder wall;

wherein the piston and the end wall have a recess, which forms an annular chamber;

wherein the annular chamber of the slave spring unit communicates with an enclosed space of the working spring unit; and wherein the annular chamber of the working spring unit communicates with an enclosed space in the slave spring unit, in conjunction with which connections discharging into said enclosed spaces are positioned in such a way that communication remains undisturbed by a movement of the piston in the respective spring unit.

7. Degressive gas spring, comprising:

two cylinder-piston units, one of which is selected as a working spring unit and the other as a slave spring unit;

two cylinders each having a cylinder wall;

two piston rods each having an end, the cylinders and the ends of the piston rods being mutually operatively connected so that compression of the working spring unit also brings about simultaneous compression of the slave spring unit, in conjunction with which each of the piston rods of each spring unit is mounted in an end wall in such a way as to be capable of sliding and supporting a piston, an axial position of which in each of the cylinders determines a volume of an enclosed, gas-filled space inside the spring unit;

wherein the piston in each spring unit is sealed against the cylinder wall;

wherein the piston has a recess, which forms an annular chamber;

wherein the annular chamber of the slave spring unit communicates with an enclosed space of the working spring unit; and wherein the annular chamber of the working spring unit communicates with an enclosed space in the slave spring unit.

8. Degressive gas spring, comprising:

two cylinder-piston units, one of which is selected as a working spring unit and the other as a slave spring unit;

two cylinders each having a cylinder wall;

two piston rods each having an end, the cylinders and the ends of the piston rods being mutually operatively connected so that compression of the working spring unit also brings about simultaneous compression of the slave spring unit, in conjunction with which each of the piston rods of each spring unit is mounted in an end wall in such a way as to be capable of sliding and supporting a piston, an axial position of which in each of the cylinders determines a volume of an enclosed, gas-filled space inside the spring unit;

wherein the piston in each spring unit is sealed against the cylinder wall;

wherein the end wall has a recess, which forms an annular chamber;

wherein the annular chamber of the slave spring unit communicates with an enclosed space of the working spring unit; and wherein the annular chamber of the working spring unit communicates with an enclosed space in the slave spring unit.

9. Degressive gas spring, comprising:

two cylinder-piston units, one of which is selected as a working spring unit and the other as a slave spring unit;

two cylinders each having a cylinder wall;

two piston rods each having an end, the cylinders and the ends of the piston rods being mutually operatively connected so that compression of the working spring unit also brings about simultaneous compression of the slave spring unit, in conjunction with which each of the piston rods of each spring unit is mounted in an end wall in such a way as to be capable of sliding and supporting a piston, an axial position of which in each of the cylinders determines a volume of an enclosed, gas-filled space inside the spring unit;

wherein the piston in each spring unit is sealed against the cylinder wall;

wherein the piston has a recess, which forms an annular chamber;

wherein the piston rod in the slave spring unit has a smaller diameter than that in the working spring unit both units having identical overall lengths;

wherein the annular chamber of the slave spring unit communicates with an enclosed space of the working spring unit; and wherein the annular chamber of the working spring unit communicates with an enclosed space in the slave spring unit, in conjunction with which connections discharging into said enclosed spaces are positioned in such a way that communication remains undisturbed by a movement of the piston in the respective spring unit.

* * * * *